(12) United States Patent
Sun

(10) Patent No.: US 11,214,289 B2
(45) Date of Patent: Jan. 4, 2022

(54) MULTI-FUNCTIONAL FOLDING TROLLEY

(71) Applicant: Benlong Sun, Zhejiang (CN)

(72) Inventor: Benlong Sun, Zhejiang (CN)

(73) Assignee: ZHEJIANG PRIDE LEISURE PRODUCTS CO., LTD., Zhejiang Province (CN)

(*) Notice: Subject to any disclaimer, the term of this patent is extended or adjusted under 35 U.S.C. 154(b) by 225 days.

(21) Appl. No.: 16/696,836

(22) Filed: Nov. 26, 2019

(65) Prior Publication Data

US 2021/0155276 A1 May 27, 2021

(51) Int. Cl.
*B62B 1/12* (2006.01)

(52) U.S. Cl.
CPC ...................................... *B62B 1/12* (2013.01)

(58) Field of Classification Search
CPC ........................................................ B62B 1/12
See application file for complete search history.

(56) References Cited

U.S. PATENT DOCUMENTS

| | | | | |
|---|---|---|---|---|
| 3,202,438 A | * | 8/1965 | Panknin | B62B 1/12 |
| | | | | 280/42 |
| 6,349,962 B1 | * | 2/2002 | Johanson | B62B 3/02 |
| | | | | 280/42 |
| 8,162,349 B1 | * | 4/2012 | Roselle | B62B 1/12 |
| | | | | 280/654 |
| 9,615,654 B2 | * | 4/2017 | Grace | A47B 3/087 |

* cited by examiner

*Primary Examiner* — Bryan A Evans
(74) *Attorney, Agent, or Firm* — WPAT Law, P.C.; Anthony King

(57) ABSTRACT

A multi-functional folding trolley comprises a trolley frame including a front wall, two side walls, and a rear wall, wherein the front wall and the rear wall are formed by frames composed of connection rods, and the two side walls are formed by scissor-shaped connection rod assemblies. The multi-functional folding trolley further comprises an angle-adjustable trolley pushing mechanism connected to a rear upper part of the frame of the rear wall and an axle mechanism located at a rear lower part of the frame of the rear wall and having two sides respectively provided with tires capable of being assembled and disassembled rapidly. The two-wheeled multi-functional folding trolley of the invention is suitable for various occasions.

14 Claims, 16 Drawing Sheets

MULTI-FUNCTIONAL FOLDING TROLLEY

BACKGROUND OF THE INVENTION

1. Technical Field

The invention relates to the technical field of trolleys, in particular to a multi-functional folding trolley.

2. Description of Related Art

Existing four-wheeled folding trolleys occupy a large area and have a large turning radius after being unfolded, thus being inconvenient to push or and pull in crowded places. Long parts cannot be vertically stored in the compartment due to the small height of the compartment, and bulky goods cannot be conveniently lifted into the compartment either. Two-wheeled lift trucks can solve these problems. However, the quantity of small bulk cargoes to be transported is small.

BRIEF SUMMARY OF THE INVENTION

The technical issue to be settled by the invention is to overcome the shortcomings of existing trolleys by providing a two-wheeled multi-functional folding trolley suitable for various occasions.

A technical solution adopted by the invention to settle the technical issue is as follows:

A multi-functional folding trolley comprises:

A trolley frame including a front wall, two side walls, and a rear wall, wherein the front wall and the rear wall are formed by frames composed of connection rods, and the two side walls are formed by scissor-shaped connection rod assemblies;

The lower ends of the scissor-shaped connection rod assemblies of the two side walls are respectively connected to the lower parts of the frames of the front wall and the rear wall, and the upper ends of the scissor-shaped connection rod assemblies of the two side walls are respectively connected to the upper parts of the frames of the front wall and the rear wall and slide along the frames of the front wall and the rear wall when the trolley frame is folded and unfolded to decrease and increase the distance between the front wall and the rear wall;

A turnable support plate mechanism which is connected to a front lower part of the frame of the front wall and has a rotation angle limited by the frame of the front wall;

An angle-adjustable trolley pushing mechanism connected to a rear upper part of the frame of the rear wall; an axle mechanism located at a rear lower part of the frame of the rear wall and having two sides respectively provided with tires capable of being assembled and disassembled rapidly; and A soft lining which is fixed to the trolley frame and forms a top-open internal compartment in the trolley frame when the trolley is unfolded, wherein a flat plate is disposed at the bottom of the compartment.

Furthermore, the front wall is of a rectangular frame structure formed by a firm connection of the rods.

The rear wall is of an H-shaped frame structure formed by a firm connection of the rods.

The scissor-shaped connection rod assembly of each side wall is formed by a set of crossed X-shaped rods; one of the crossed rods has a lower end connected to the lower part of the frame of the front wall as well as an upper end connected to the upper part of the frame of the rear wall, and the other one of the crossed rods has a lower end connected to the lower part of the frame of the rear wall as well as an upper end connected to the upper part of the frame of the front wall; and the upper ends of the scissor-shaped connection rod assemblies of the two side walls slide upwards and downwards along the frames of the front wall and the rear wall when the trolley frame is folded and unfolded.

The front wall includes an inverted U-shaped support plate connection tube, the rear wall includes two stand tubes and a lifting handle tube, and each side wall includes a set of crossed tubes and a right-angled bent slide block; the two sets of crossed tubes are symmetrically arranged left and right; the front end and the rear end of one tube in each set of crossed tubes are respectively articulated to straight slide blocks, the straight slide block at the front side is disposed around a vertical tube on the corresponding side of the inverted U-shaped support plate connection tube and forms an up-down slide block pair with this vertical tube, a limit sleeve is fixedly installed on the vertical tube of the inverted U-shaped support plate connection tube and is arranged below the straight slide block at the front side, and the straight slide block at the rear side is disposed around a vertical tube on the corresponding side of the inverted U-shaped support plate connection tube and is fixedly connected with this vertical tube; the front end and the rear end of the other tube in each set of crossed tubes are respectively articulated to a bent slide block and the right-angled bent slide block, the bent slide block is fixedly installed on the vertical tube on the corresponding side of the inverted U-shaped support plate connection tube and is located below the limit sleeve, and the right-angled bent slide block is installed on the vertical tube on the corresponding side of the inverted U-shaped support plate connection tube in a vertical sliding manner and is arranged above the straight slide block at the rear side; and the two right-angled bent slide blocks are connected through the lifting handle tube, and the upper parts of the two vertical tubes are connected through a connection tube.

Furthermore, the support plate mechanism is formed by laying a flat plate on rods, is articulated to the front lower part of the frame of the front wall, and can be turned to be parallel or perpendicular to the frame of the front wall.

The support plate mechanism includes a U-shaped bottom frame open towards a folding mechanism, three horizontal bottom tubes, a plastic plate, and two sets of L-shaped iron sheets, wherein two horizontal bottom tubes used for supporting the plastic plate are fixed to the intermediate part of the U-shaped bottom frame and are covered with the plastic plate, and each set of L-shaped iron sheets includes two L-shaped iron sheets; the two sets of L-shaped iron sheets have one ends respectively fixed to the left end and the right end of the U-shaped bottom frame in a clamping manner as well as the other ends respectively riveted to the left end and the right end of the inverted U-shaped support plate connection tube in a clamping manner with rivets, so that after the support plate mechanism axially rotates around the rivets by an angle of 90°, two ends of the U-shaped bottom frame 3 abut against arc surfaces of the support plate connection tube to be prevented from moving; and the two internal L-shaped iron sheets are connected through the third horizontal bottom tube.

Furthermore, the trolley pushing mechanism is formed by a connection of rotation locking mechanisms, which are fixed to the rear upper part of the frame of the rear wall, and a handle tube, and the rotation locking mechanisms achieve the connection and disconnection of two limit bases by pushing limit slide blocks in the two limit bases to fulfill locking and unlocking for rotation.

Each handle rotation locking mechanism includes one limit base, one limit slide block, a spring, a key base, and a key used for pushing the limit slide block to move, wherein the limit base and the key base are fixed with a rivet and are buckled to form a cavity allowing the annular limit slide block and the spring to be installed therein; wave-shaped grooves of the same size are formed in internal circumferential walls of buckling cavities of the limit base and the key base, and wave-shaped protrusions engaged with the wave-shaped grooves are arranged on an external circumferential wall of the limit slide block, and the thickness of the limit slide block is slight less than the depth of the buckling cavity of the limit base and is far greater than the depth of the buckling cavity of the key base; and the limit slide block and the spring are disposed around the rivet, one end of the spring is connected with the limit base, and the other end of the spring is connected with the limit slide block;

The key is installed on the key base and is provided with four claws corresponding to four holes, the four holes in the key base are communicated with the cavity, and the four claws on the key penetrate through the four holes in the key base to abut against the limit slide block; and The limit base is provided with a casing connected with the U-shaped handle tube, and the key base is provided with a casing connected with the upper end of the corresponding stand tube.

Furthermore, the axle mechanism is composed of an axle tube fixed to the rear lower part of the frame of the rear wall and limit axles which are inserted into the axle tube and are sleeved with the tires, and retractable lug bosses enter or come out of holes in the axle tube to rapidly assemble the tires on the limit axles or disassemble the tires from the limit axles.

The axle mechanism includes two tires, two limit axles, two spring fasteners, two plastic axle connection sleeves, and one axle tube, wherein each plastic axle connection sleeve is composed of a horizontal tube and a vertical tube perpendicular to the horizontal tube; the horizontal tubes of the two plastic axle connection sleeves are respectively received in the left end and the right end of the axle tube to be fixed, and the vertical tubes of the two plastic axle connection sleeves are respectively received in the lower ends of the two stand tubes to be fixed; and a flanged end of each limit axle is assembled in a central hole of the tire at the corresponding side, and the other end of the limit axle is detachably connected with the axle tube through the corresponding spring fastener.

Furthermore, the flat plate at the bottom of the compartment can be separated from the compartment and is identical in size to the bottom of the compartment.

The invention has the following beneficial effects: the multi-functional folding trolley can be folded, can carry bulky goods such as steel cylinders, iron buckets, and cases just like a two-wheeled lift truck or carry small bulk cargoes just like a four-wheeled trolley after being unfolded, and can be used as a refuse cart, a shopping trolley, a luggage barrow, a carrier, or the like under various road conditions and places through replacement of tire types.

DETAILED DESCRIPTION OF THE INVENTION

The invention is further expounded as follows in combination with the accompanying drawings.

Figure 10:
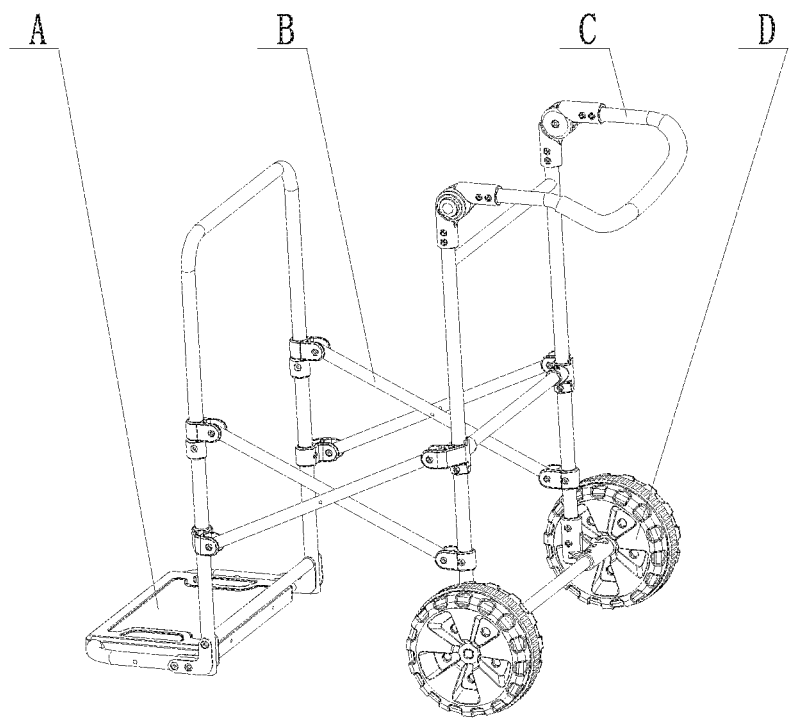
FIG. 10 is a structural view of the trolley frame.

Referring to FIG. 1 to FIG. 21, a multi-functional folding trolley comprises a support plate mechanism A, a folding mechanism B, a trolley pushing mechanism C, and an axle mechanism D, specifically as shown in FIG. 10. Wherein, the folding mechanism B is a main part, and the support plate mechanism A, the trolley pushing mechanism C, and the axle mechanism D are supported on the folding mechanism B; the support plate mechanism A is used for storing boxed articles or articles which are inconvenient to load and unload; the folding mechanism B is provided with a cloth or other structures which can define a compartment, and the compartment is folded and unfolded through the folding mechanism B; the trolley pushing mechanism C is used for pushing or pulling the trolley; and the axle mechanism D is used for driving the trolley to move.

Figure 12:
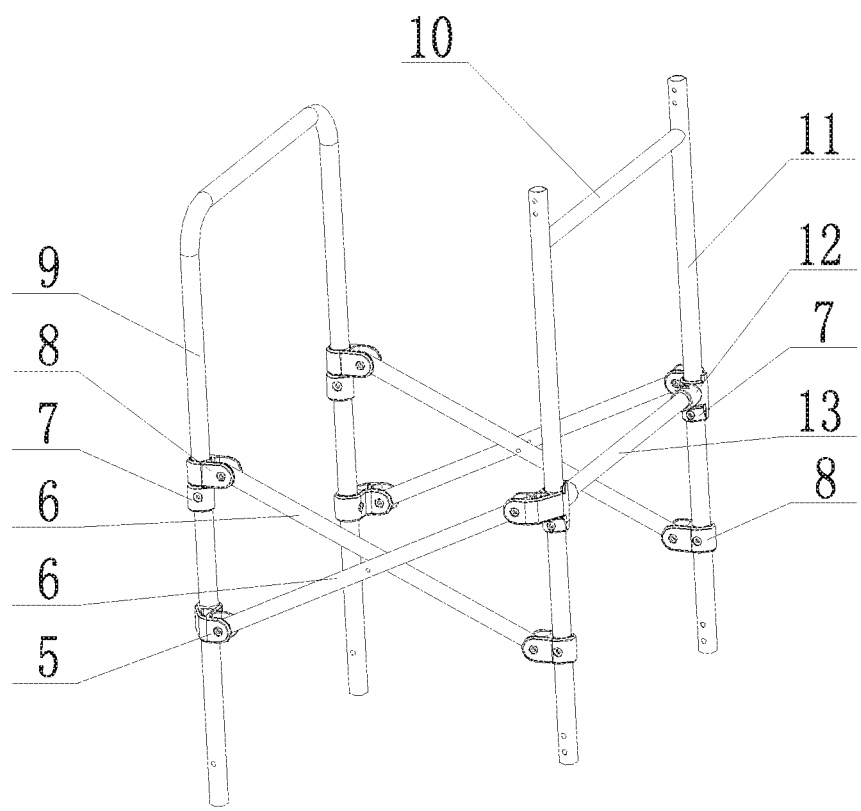
FIG. 12 is a schematic diagram of a folding mechanism.

The folding mechanism B includes two bent slide blocks 5, four crossed tubes 6, four limit sleeves 7, four straight slide blocks 8, an inverted U-shaped support plate connection tube 9, a connection tube 10, two stand tubes 11, two right-angled bent slide blocks 12, and a lifting handle tube 13, as shown in FIG. 12. The four crossed tubes 6 form two crossed structures, the front end and the rear end of one crossed tube 6 in each crossed structure are respectively riveted to the two corresponding straight slide blocks 8, the front end of the other crossed tube 6 in the crossed structure is riveted to the corresponding bent slide block 5, and the rear end of the other crossed tube 6 in the crossed structure is riveted to the corresponding right-angled bent slide block 12. Wherein, in each crossed structure, the bent slide block 5 riveted to the lower part of one crossed tube 6 is fixed to a vertical tube of the inverted U-shaped support plate connection tube 9, and the right-angled bent slide block 12 riveted to the upper part of the crossed tube 6 is disposed around the corresponding stand tube 11; and the straight slide block 8 riveted to the lower part of the other crossed tube 6 is fixed to the stand tube 11 on the same side, and the straight slide block 8 riveted to the upper part of the other crossed tube 6 is disposed around the vertical tube, on the same side, of the inverted U-shaped support plate connection tube 9. The limit sleeves 7 are respectively fixed to two vertical tubes of the inverted U-shaped support plate connection tube 9 and the two stand tubes 11 to limit an unfolding length. The connection tube 10 is fixed between the two stand tubes 11, and the two right-angled bent slide blocks 12 are connected through the lifting handle tube 13. A soft lining is arranged on the folding mechanism.

Figure 11:
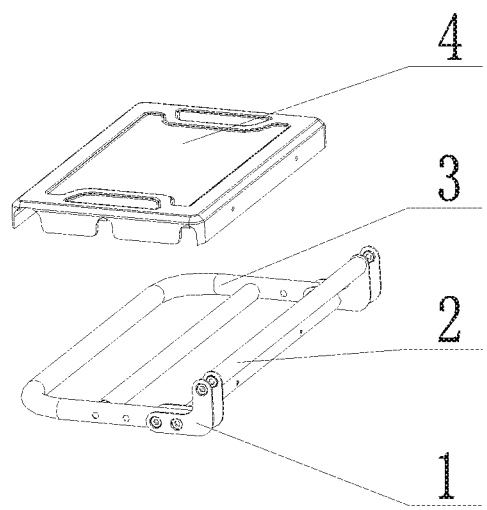
FIG. 11 is an exploded view of a support plate mechanism.

The support plate mechanism A includes four L-shaped iron sheets 1, three horizontal bottom tubes 2, a U-shaped bottom frame 3, and a plastic plate 4, as shown in FIG. 11. Two horizontal bottom tubes used for supporting the plastic plate 4 are fixed to the intermediate part of the U-shaped bottom frame 3 and are covered with the plastic plate 4, one edges of every two of the four L-shaped iron sheets 1 are fixed to one of the two ends of the U-shaped bottom frame 3 in a clamping manner, and the other edges of every two of the four L-shaped iron sheets 1 are riveted to one of the two ends of the inverted U-shaped support plate connection tube 9, and the two internal L-shaped iron sheets are connected through the third horizontal bottom tube, so that after the support plate mechanism A axially rotates around rivets by an angle of 90°, the two ends of the U-shaped bottom frame 3 abut against arc surfaces of the inverted U-shaped support plate connection tube 9 to be prevented from moving.

Figure 13:
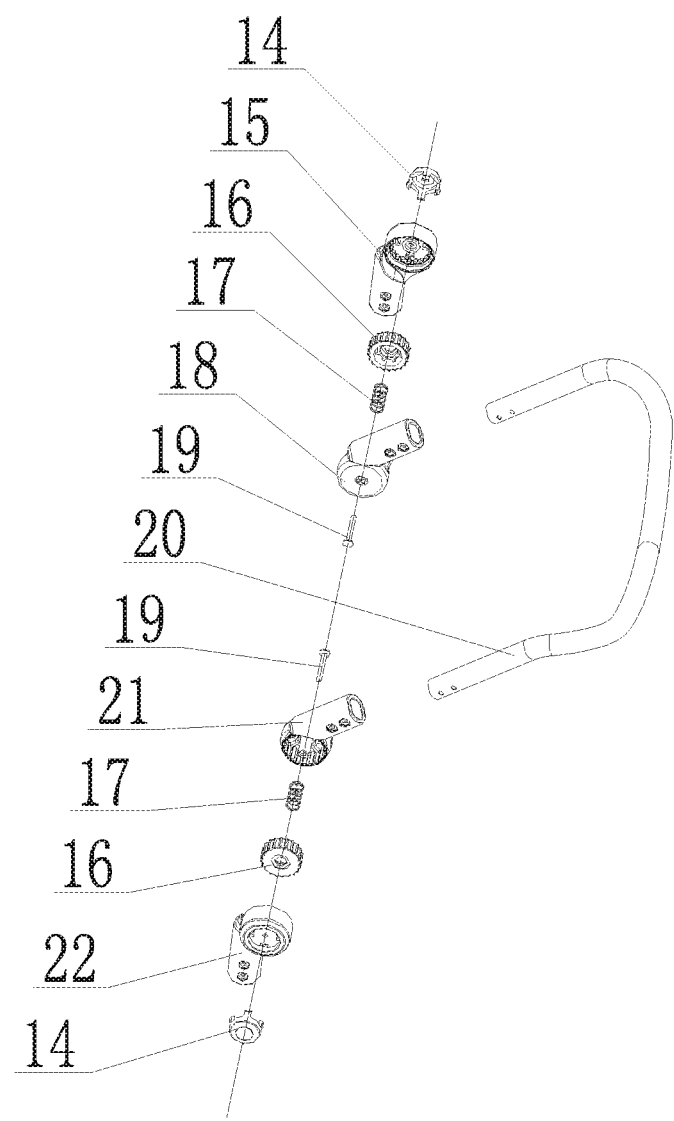
FIG. 13 is an exploded view of a handle mechanism.
Figure 15:
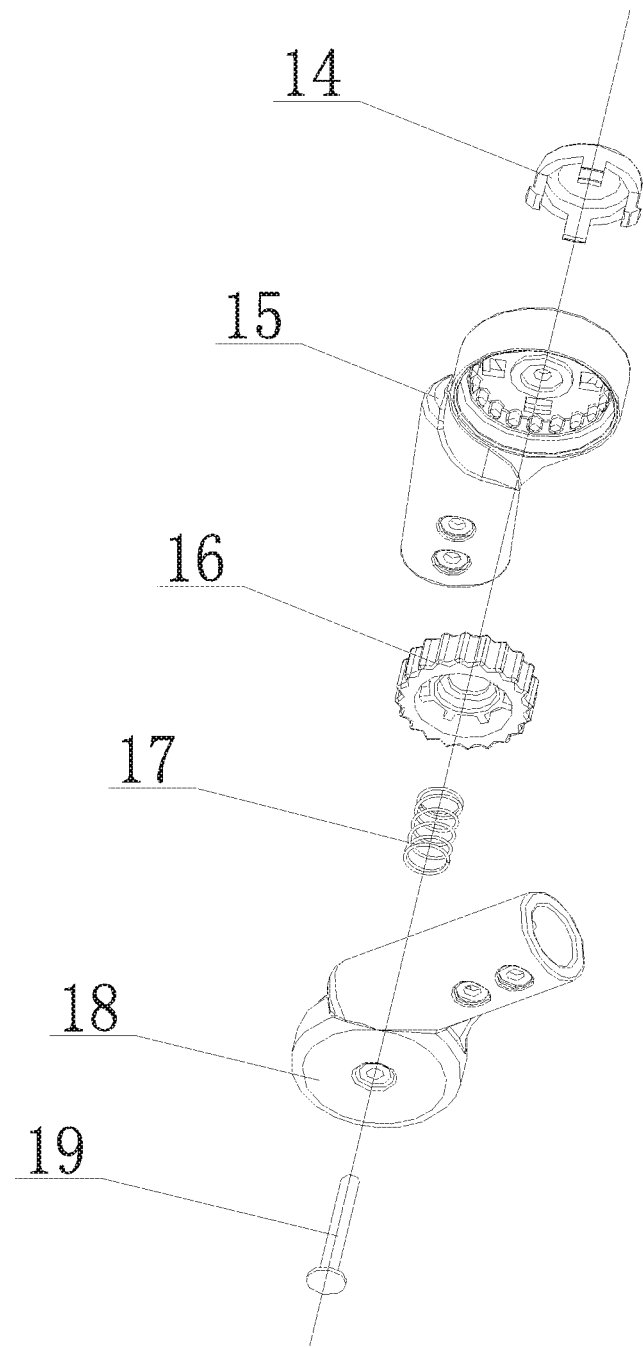
FIG. 15 is an exploded view of a handle rotation locking structure.
Figure 16:
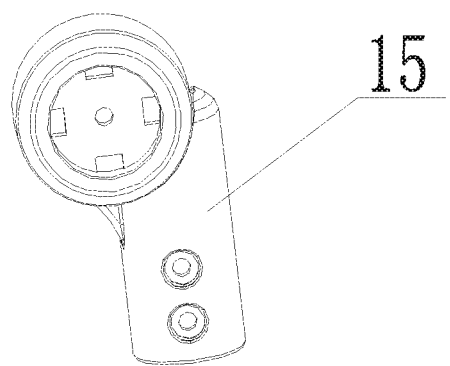
FIG. 16 is an external view of a right key base.
Figure 17:
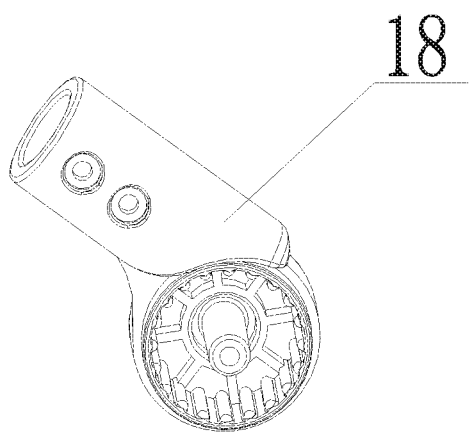
FIG. 17 is an internal view of a right limit base.
Figure 18:
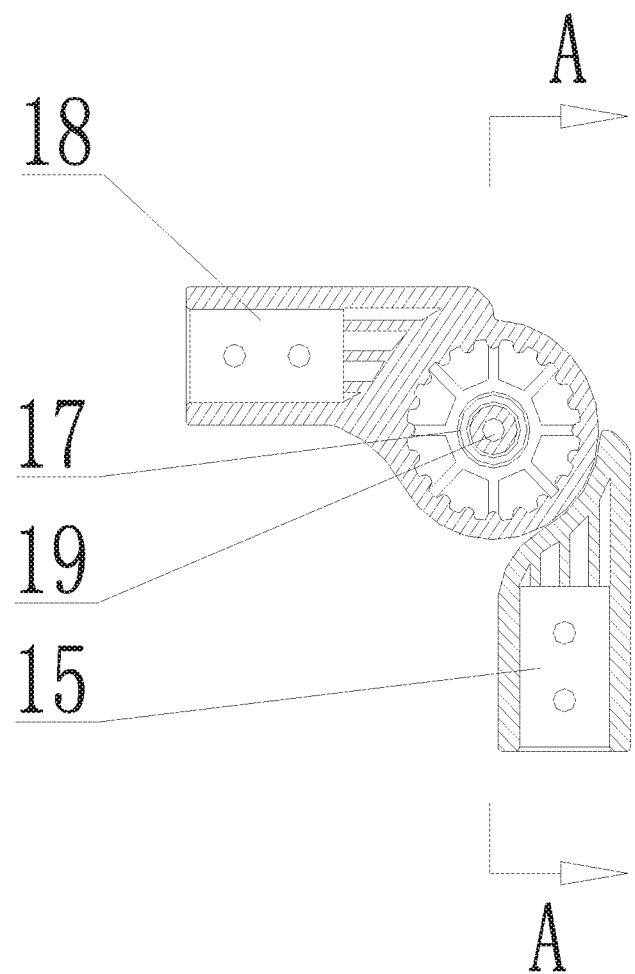
FIG. 18 is a schematic diagram of the handle rotation locking structure in FIG. 15 in a state where a key is not pressed.
Figure 19:
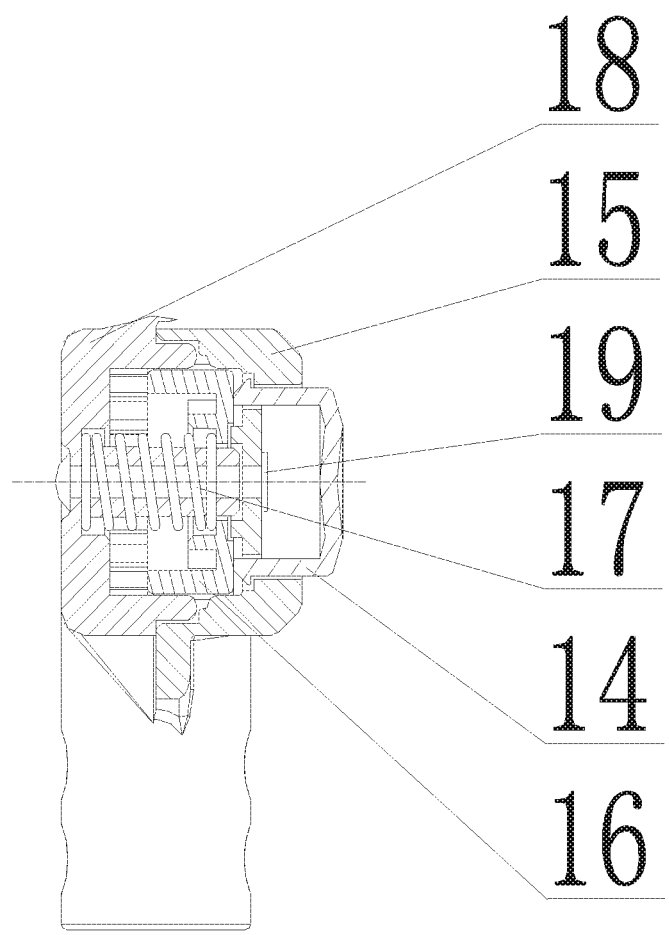
FIG. 19 is a sectional view of A-A in FIG. 18.
Figure 20:
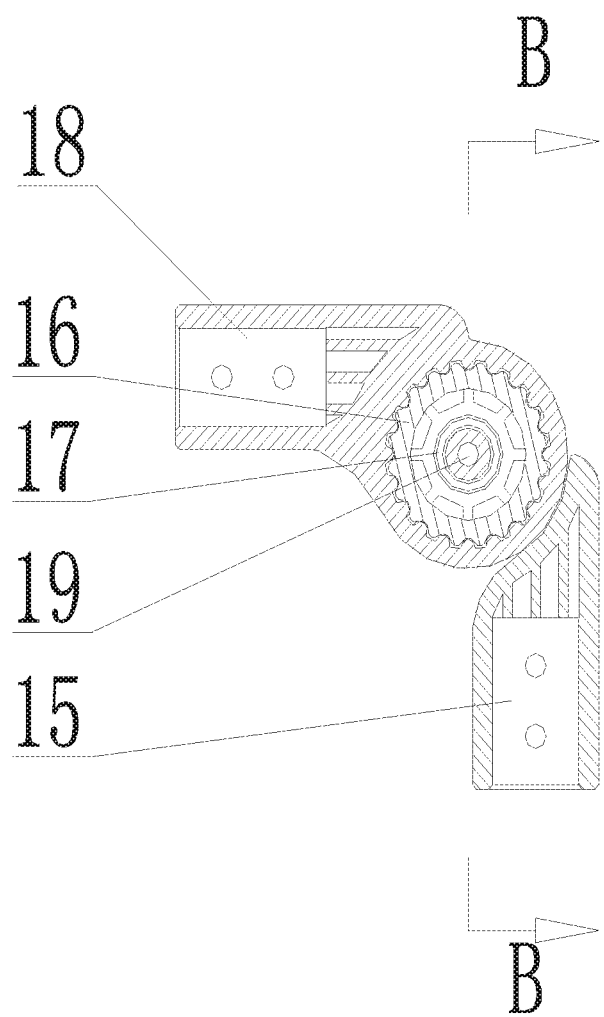
FIG. 20 is a schematic diagram of the handle rotation locking structure in FIG. 15 in a state where the key is pressed.
Figure 21:
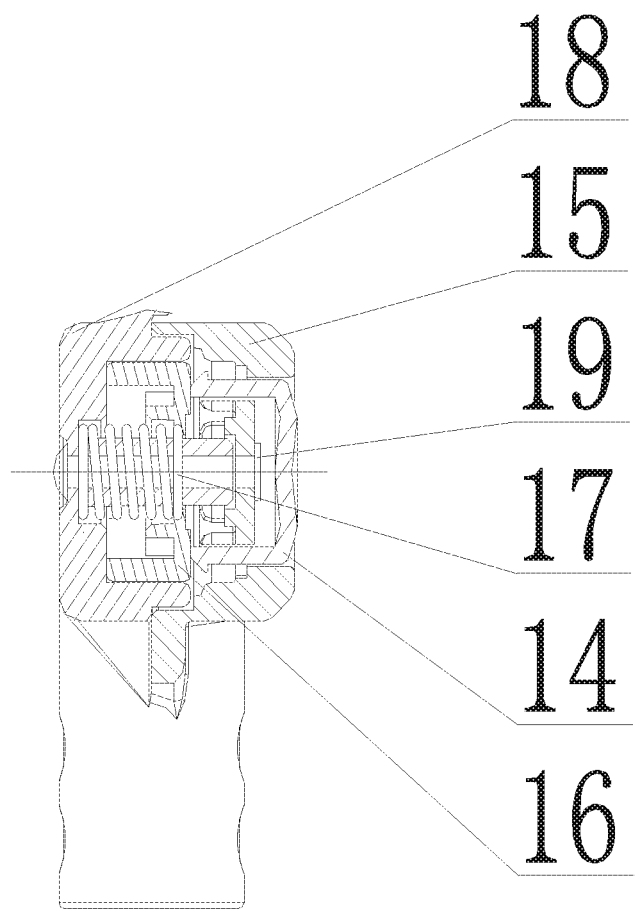
FIG. 21 is a sectional view of B-B in FIG. 20.

The trolley pushing mechanism C includes two keys 14, a pair of symmetrical key bases, two limit slide blocks 16, two springs 17, a pair of symmetrical limit bases, two rivets 19, and a U-shaped handle tube 20, as shown in FIG. 13. The pair of key bases includes a right key base 15 and a left key base 22, the pair of limit bases includes a right limit base 18 and a left limit base 21, and the right limit base 18 and the right key base 15 are buckled to formed a cavity allowing one limit slide block 16 and one spring 17 to be installed therein and are fixed with one rivet 19. One key 14 used for pushing the limit slide block 16 to move penetrates through four holes in the right key base 15 from the outside to be installed, as shown in FIG. 15. Wave-shaped grooves of the same size are formed in internal circumferential walls of buckling cavities of the right limit base 18 and the right key base 15, and wave-shaped protrusions engaged with the wave-shaped grooves are arranged on an external circumferential wall of the limit slide block 16, and the thickness of the limit slide block 16 is slight less than the depth of the buckling cavity of the right limit base 18 and is far greater than the depth of the buckling cavity of the right key base 15, so that when the key 14 is not pressed, as shown in 18, the limit slide block 16 abuts against an internal buckling wall of the right key base 15 under an acting force from the spring 17. When the wave-shaped protrusions on the external circumferential wall of the limit slide block 16 are simultaneously engaged with the wave-shaped grooves in the internal circumferential walls of the right key base 15 and the right limit base 18, the right limit base 18 and the right key base 15 are prevented from rotating. When the key 14 is pressed, as shown in FIG. 20, four claws of the key penetrate through the holes in the internal buckling wall of the right key base 15 to push the limit slide block 16 to compress the spring 17 till the limit slide block 16 slides deep into the cavity of the right limit base 18 disengage from the groove of the right key base 15, so that the right limit base 18 and the right key base 15 are released and can rotate freely. The right limit base 18 and the left limit base 21 which are buckled together are respectively fixed to two ends of the U-shaped handle tube 20, and the right key base 15 and the left key base 22 are fixed to the upper ends of the two stand tubes 11.

Figure 14:
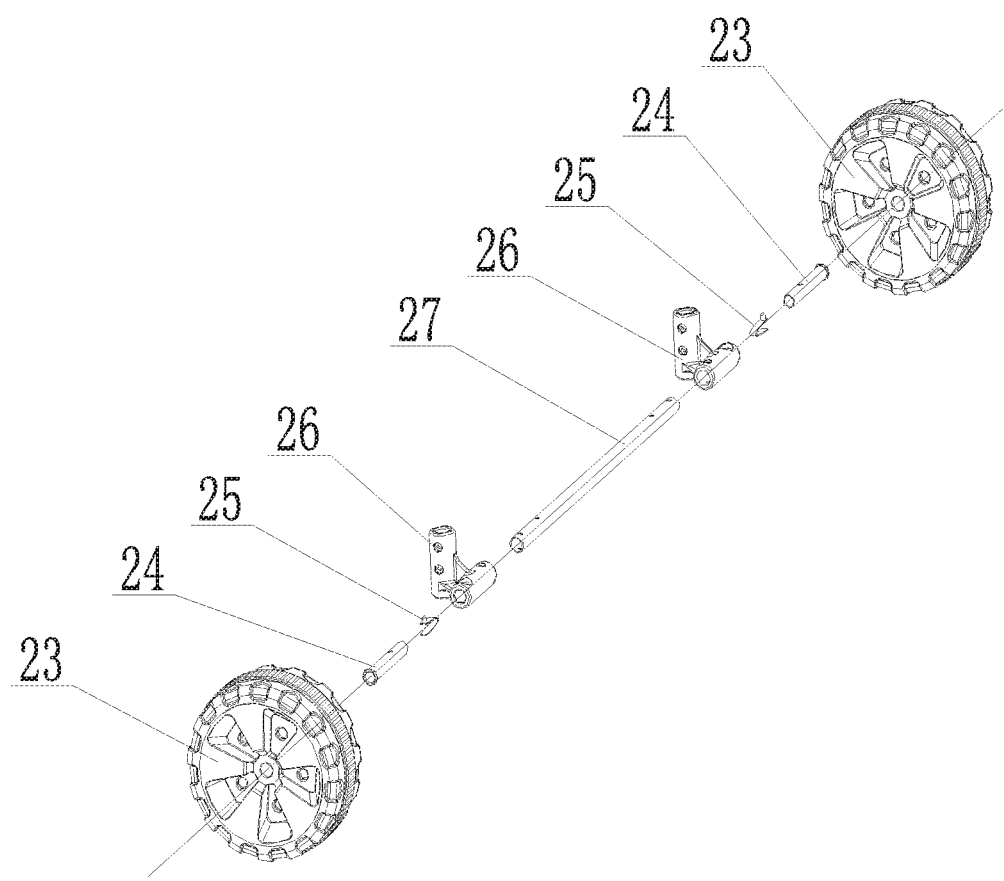
FIG. 14 is an exploded view of an axle mechanism.

The axle mechanism D includes two limit axles 24, two spring fasteners 25, two plastic axle connection sleeves 26, and an axle tube 27, as shown in FIG. 14. Each plastic axle connection sleeve 26 is composed of a horizontal tube and a vertical tube perpendicular to the horizontal tube; and the horizontal tubes of the two plastic axle connection sleeves 26 are received in two ends of the axle tube 27 to be fixed, and the vertical tubes of the two plastic axle connection sleeves 26 are received in the lower ends of the two stand tubes 11 to be fixed. One end of each limit axle 24 has a flange used for shielding a tire 23, and a hole used for installing one spring fastener 25 is formed in the circular surface of the other end of the limit axle 24. The limit axle 24 having the flange exposed is inserted into a central hole of the tire 23, and the spring fastener 25 is installed in a tube of the limit axle 24 to form a fast detachable tire assembly. The fast detachable tire assembly is inserted into the axle tube 27, so that the internal side of the tire 23 abuts against the end face of the horizontal tube of the corresponding plastic axle connection sleeve 26. At this moment, the head of the spring fastener 25 in the tube of the limit axle 24 is exactly clamped in a hole in the axle tube 27, so that the limit axle 24 is prevented from moving, and the tire 23 on the limit axle 24 is able to rotate only and is unable to move axially.

Figure 3:
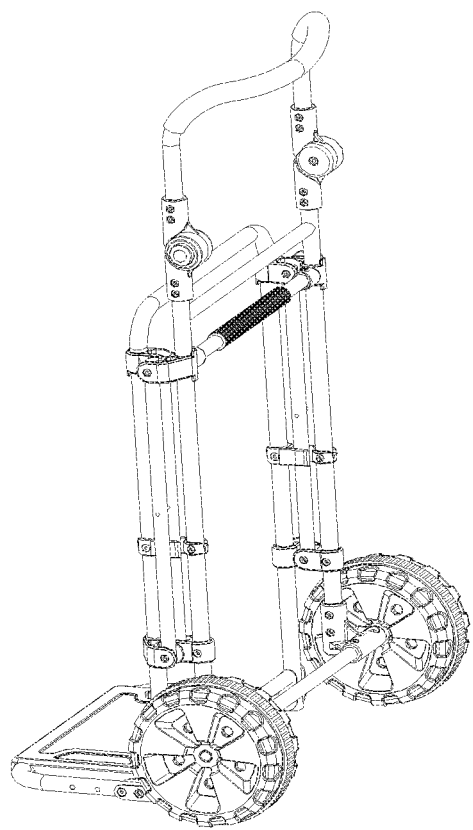
FIG. 3 is a schematic diagram of the trolley frame in a half folded state.
Figure 4:
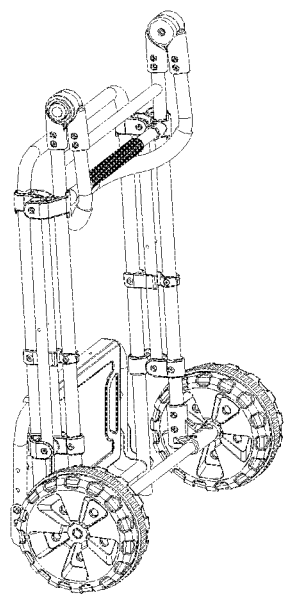
FIG. 4 is a schematic diagram of the trolley frame in a full folded state.
Figure 5:
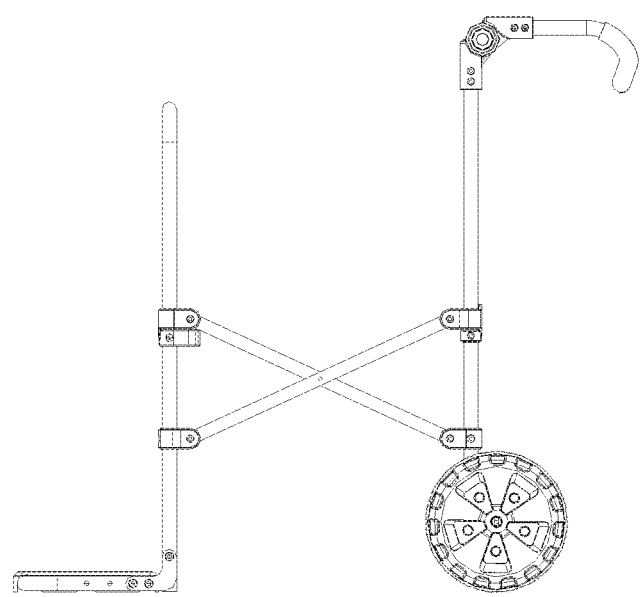
FIG. 5 is a side view of the trolley frame.
Figure 6:
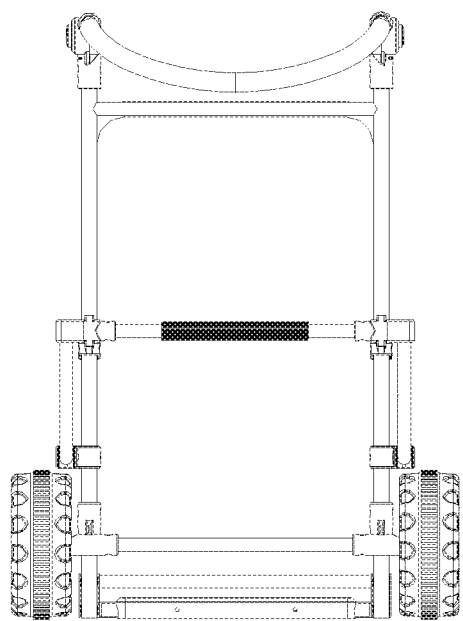
FIG. 6 is a rear view of the trolley frame.
Figure 7:
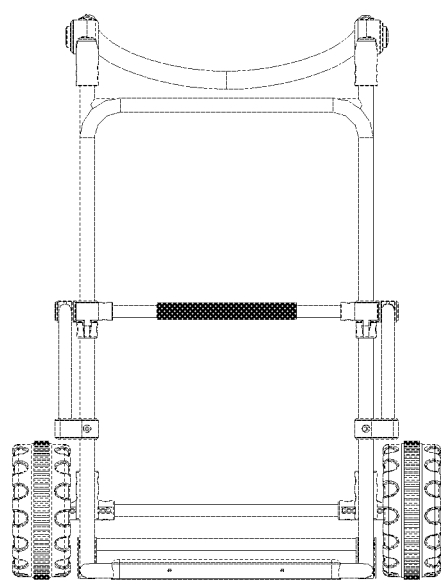
FIG. 7 is a front view of the trolley frame.
Figure 8:
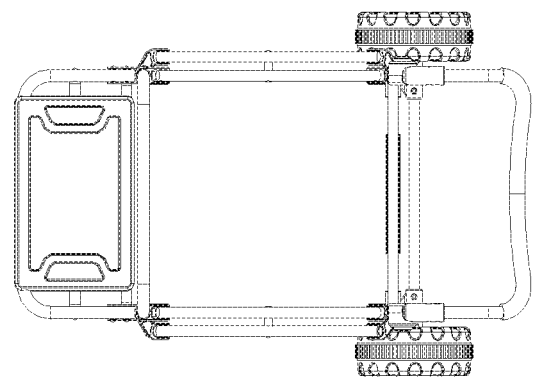
FIG. 8 is a top view of the trolley frame.
Figure 9:
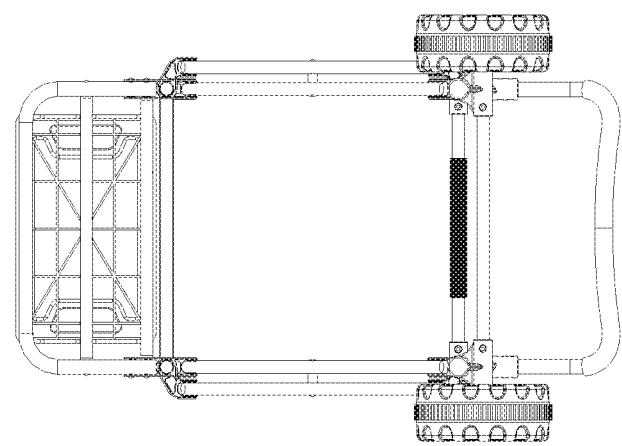
FIG. 9 is a bottom view of the trolley frame.

The Operating Principle of the Invention is as Follows:

When the multi-functional folding trolley needs to be folded, the lifting handle tube 13 is grasped by hand to be lifted upwards, at this moment, the right-angled bent slide blocks 12 connected with the two ends of the lifting handle tube 13 simultaneously move upwards along the stand tubes 11 to drive the crossed tubes 6 riveted to the right-angled bent slide blocks 12 to move upwards accordingly. Because the bent slides 12 riveted to the other ends of these crossed tubes 6 are fixed to the inverted U-shaped support plate connection tube 9, the straight slide blocks 8 riveted to the other crossed tubes 6 articulated to these crossed tubes 6 are stationary on the stand tubes 11 and are slidable on the inverted U-shaped support plate connection tube 9. At this moment, the straight slide blocks 8 riveted to the other crossed tubes 6 move upwards to draw the inverted U-shaped support plate connection tube 9 to be close to the stand tubes 11 till the inverted U-shaped support plate connection tube 9 is in contact with the stand tubes 11. In this way, the folding mechanism B is folded completely, as shown in FIG. 3. The bottom frame 3 is lifted upwards, so that the L-shaped iron sheets 1 fixed to the bottom frame 3 rotate axially around rivets riveted to the inverted U-shaped support plate connection tube 9 to drive parts fixed to the bottom frame 3 to rotate at the same time till the bottom frame 3 is parallel to the inverted U-shaped support plate connection tube 9, in this way, the support plate mechanism A is folded, as shown in FIG. 4. The left and right keys 14 are simultaneously pressed with both hands to push the limit slide blocks 16 in the right key base 15 and the left key base 22 to move inwards to compress the springs 17, so that the limit slide blocks 16 slide into the right limit base 18 and the left limit base 21 along the wave-shaped grooves, thus disengaging from the grooves in the right key base 15 and the left key base 22 to be unlocked. Meanwhile, the handle tube 20 is downwards pressed to rotate to the lowest point, and the keys 14 are released to restore a locking state, so that a handle is folded, as shown in FIG. 4. As necessary, the heads of the spring fasteners 25 on the axle tube 27 are pressed to make the spring fasteners 25 retreat into the limit axles 24, and the tires 23 are outwards drawn to drive the limit axles 24 together with the spring fasteners 25 out of the axle tube 27, so that less space is occupied.

Figure 1:
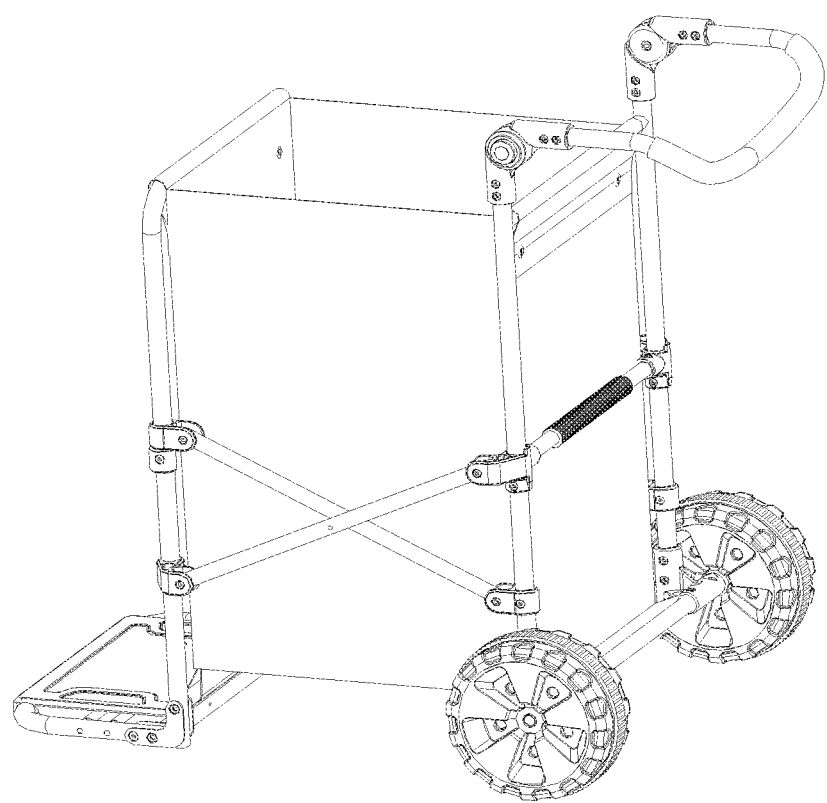
FIG. 1 is a structural view of the invention.
Figure 2:
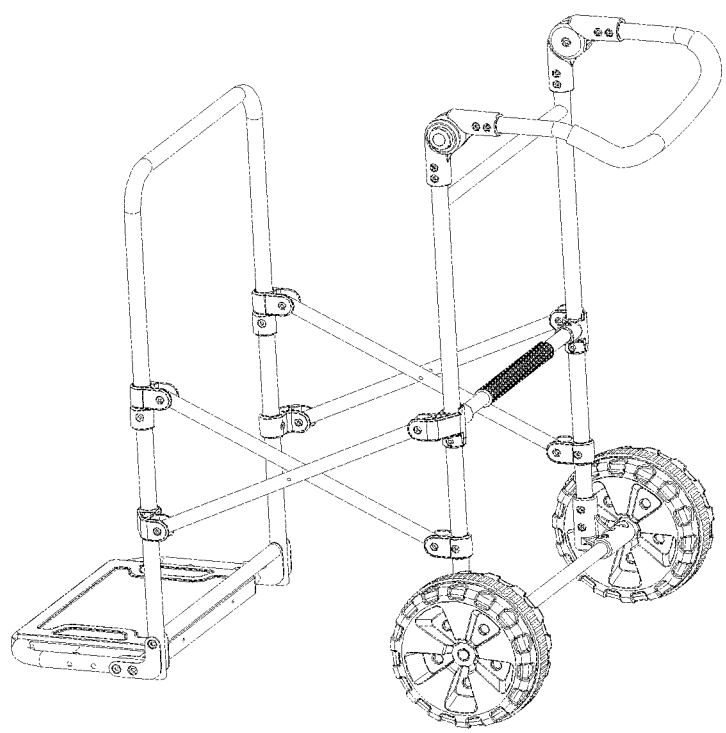
FIG. 2 is a schematic diagram of a trolley frame in an unfolded state.

When the multi-functional folding trolley needs to be unfolded, the lifting handle tube 13 is grasped by hand to be pressed downwards, so that the right-angled bent slide blocks 12 connected with the two ends of the lifting handle tube 13 simultaneously move downwards along the stand tubes 11 to drive the crossed tubes to be unfolded outwards so as to push the inverted U-shaped support plate connection tube 9 to move outwards horizontally to be unfolded, and the support plate mechanism A on the inverted U-shaped support plate connection tube 9 moves at the same time and stops moving when abutting against the limit sleeves 7, as shown in FIG. 2. The bottom frame 3 is pulled downwards till the support plate mechanism A rotates to be perpendicular to the inverted U-shaped support plate connection tube 9, and two ends of the U-shaped bottom frame 3 abut against the arc surfaces of the inverted U-shaped support plate connection tube 9, so that the U-shaped bottom frame 3 is unable to continue to rotate, as shown in FIG. 2. The left and right keys 14 are pressed simultaneously, the handle tube 20 is pulled to rotate to a desired position, and then the keys 14 are released to restore the locking state, so that the angle of the handle is adjusted, as shown in FIG. 2.

What is claimed is:

1. A multi-functional folding trolley, comprising:
    a trolley frame including a front wall, two side walls, and a rear wall, wherein the front wall and the rear wall are formed by frames composed of connection rods, and the two side walls are formed by scissor-shaped connection rod assemblies; and lower ends of the scissor-shaped connection rod assemblies of the two side walls are respectively connected to lower parts of the frames of the front wall and the rear wall, and upper ends of the scissor-shaped connection rod assemblies of the two side walls are respectively connected to upper parts of the frames of the front wall and the rear wall and slide along the frames of the front wall and the rear wall when the trolley frame is folded and unfolded to decrease and increase a distance between the front wall and the rear wall;
    a turnable support plate mechanism which is connected to a front lower part of the frame of the front wall and has a rotation angle limited by the frame of the front wall;
    an angle-adjustable trolley pushing mechanism connected to a rear upper part of the frame of the rear wall; an axle mechanism located at a rear lower part of the frame of the rear wall and having two sides respectively provided with tires capable of being assembled and disassembled rapidly; and
    a soft lining which is fixed to the trolley frame and forms atop-open internal compartment in the trolley frame when the trolley is unfolded, wherein a flat plate is disposed at a bottom of the compartment.

2. The multi-functional folding trolley according to claim 1, wherein the front wall is of a rectangular frame structure formed by a firm connection of the rods.

3. The multi-functional folding trolley according to claim 1, wherein the rear wall is of an H-shaped frame structure formed by a firm connection of the rods.

4. The multi-functional folding trolley according to claim 2, wherein the rear wall is of an H-shaped frame structure formed by a firm connection of the rods.

5. The multi-functional folding trolley according to claim 1, wherein the scissor-shaped connection rod assembly of each said side wall is formed by a set of crossed X-shaped rods; one of the crossed rods has a lower end connected to the lower part of the frame of the front wall as well as an upper end connected to the upper part of the frame of the rear wall, and the other one of the crossed rods has a lower end connected to the lower part of the frame of the rear wall as well as an upper end connected to the upper part of the frame of the front wall; and the upper ends of the scissor-shaped connection rod assemblies of the two side walls slide upwards and downwards along the frames of the front wall and the rear wall when the trolley frame is folded and unfolded.

6. The multi-functional folding trolley according to claim 2, wherein the scissor-shaped connection rod assembly of each said side wall is formed by a set of crossed X-shaped rods; one of the crossed rods has a lower end connected to the lower part of the frame of the front wall as well as an upper end connected to the upper part of the frame of the rear wall, and the other one of the crossed rods has a lower end connected to the lower part of the frame of the rear wall as well as an upper end connected to the upper part of the frame of the front wall; and the upper ends of the scissor-shaped connection rod assemblies of the two side walls slide upwards and downwards along the frames of the front wall and the rear wall when the trolley frame is folded and unfolded.

7. The multi-functional folding trolley according to claim 1, wherein the support plate mechanism is formed by laying a flat plate on rods, is articulated to the front lower part of the frame of the front wall, and can be turned to be parallel or perpendicular to the frame of the front wall.

8. The multi-functional folding trolley according to claim 2, wherein the support plate mechanism is formed by laying a flat plate on rods, is articulated to the front lower part of the frame of the front wall, and can be turned to be parallel or perpendicular to the frame of the front wall.

9. The multi-functional folding trolley according to claim 1, wherein the trolley pushing mechanism is formed by a connection of rotation locking mechanisms, which are fixed to the rear upper part of the frame of the rear wall, and a handle tube, and the rotation locking mechanisms achieve a connection and disconnection of two limit bases by pushing limit slide blocks in the two limit bases to fulfill locking and unlocking for rotation.

10. The multi-functional folding trolley according to claim 2, wherein the trolley pushing mechanism is formed by a connection of rotation locking mechanisms, which are fixed to the rear upper part of the frame of the rear wall, and a handle tube, and the rotation locking mechanisms achieve a connection and disconnection of two limit bases by pushing limit slide blocks in the two limit bases to fulfill locking and unlocking for rotation.

11. The multi-functional folding trolley according to claim 1, wherein the axle mechanism is composed of an axle tube fixed to the rear lower part of the frame of the rear wall and limit axles which are inserted into the axle tube and are sleeved with the tires, and retractable lug bosses enter or come out of holes in the axle tube to rapidly assemble the tires on the limit axles or disassemble the tires from the limit axles.

12. The multi-functional folding trolley according to claim 2, wherein the axle mechanism is composed of an axle tube fixed to the rear lower part of the frame of the rear wall and limit axles which are inserted into the axle tube and are sleeved with the tires, and retractable lug bosses enter or come out of holes in the axle tube to rapidly assemble the tires on the limit axles or disassemble the tires from the limit axles.

13. The multi-functional folding trolley according to claim 1, wherein the flat plate at the bottom of the compartment can be separated from the compartment and is identical in size to the bottom of the compartment.

14. The multi-functional folding trolley according to claim 2, wherein the flat plate at the bottom of the compartment can be separated from the compartment and is identical in size to the bottom of the compartment.

* * * * *